UNITED STATES PATENT OFFICE.

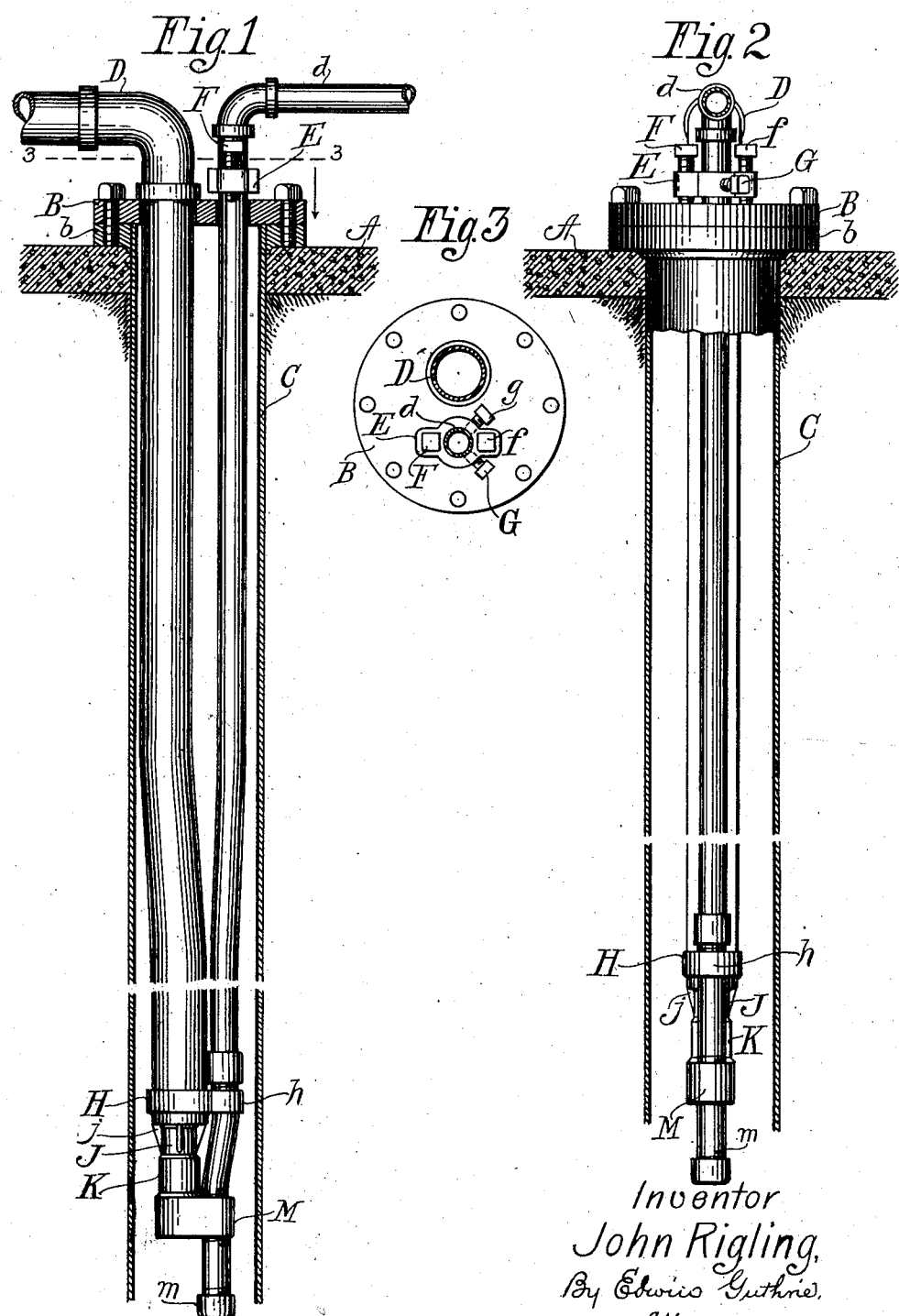

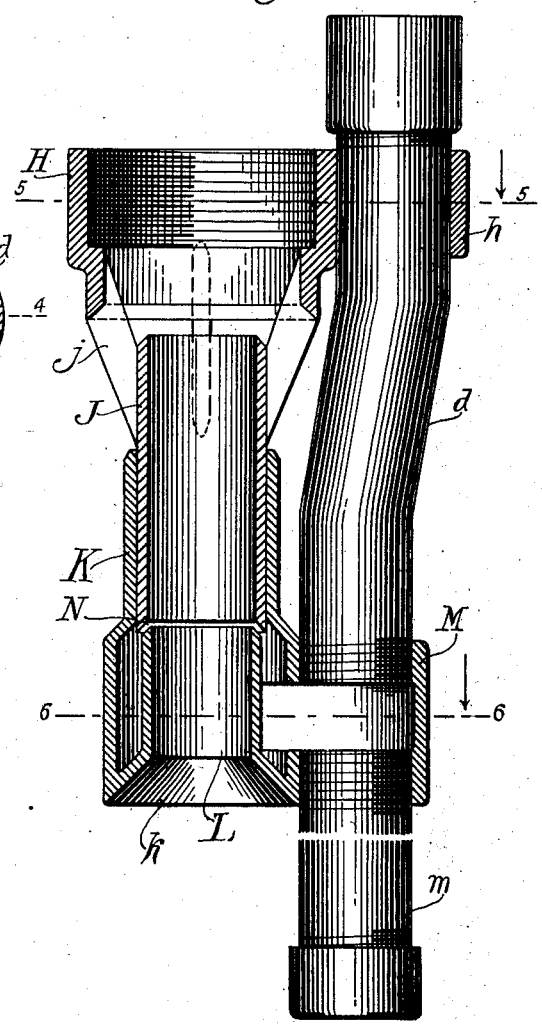
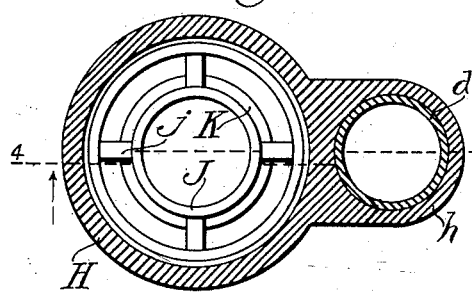
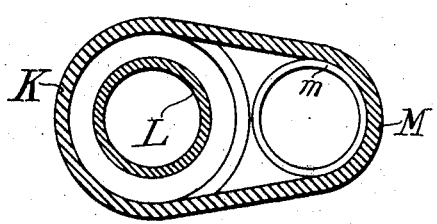

JOHN RIGLING, OF PHILADELPHIA, PENNSYLVANIA.

TWO-STAGE AIR-LIFT PUMP.

1,333,279.  Specification of Letters Patent.  Patented Mar. 9, 1920.

Application filed August 1, 1918, Serial No. 247,812. Renewed July 29, 1919. Serial No. 314,161.

*To all whom it may concern:*

Be it known that I, JOHN RIGLING, citizen of the United States, residing at Philadelphia, in the county of Philadelphia and State of Pennsylvania, have invented certain new and useful Improvements in Two-Stage Air-Lift Pumps, of which the following is a specification.

This invention relates to two stage air lift pumps, and belongs to that class of apparatus for elevating water by the action of compressed air so applied as to produce an aerated vertical column of water, lightened in weight and impressed with an upward movement.

In explanation of the object of this invention it may be stated that this applicant has had considerable experience with compressed air water elevators, and has found that in many of them employing float-operated mechanism, the violent action of the compressed air sooner or later pounds some part out of service. It is his intention, therefore, to avoid the use of floats and valve mechanism. Again, with the ordinary air lift pumps of the same character as this invention, with which this applicant is acquainted, the throttle valve or air valve is placed near the top of the well. Thus, the expansion of the air takes place in the air-supply pipe, and enters the mixing chamber at a pressure depending upon the head of water over the intake. As the water falls, the air pressure falls correspondingly and the velocity of delivery becomes lowered, and, in many installations wasteful of air. In this invention the air is throttled at the lower ends of the pipes in the well, and at the point where the air is directed into the water column. The air entrance into the mixing tube may be throttled so as to deliver the air at the first stage of the air lift at very near the maximum pressure. In this way, and as is especially important, it is quite practicable to get a high velocity of water and air in the mixing tube to act upon the water in the second stage, as will be further explained hereinbelow. It is the object of this invention to produce devices having a mixing tube and an air entrance into the mixing tube controlled in extent by moving one pipe with respect to the other, and to provide suitable means for moving the movable pipe.

To carry out this invention parts are selected and combined as illustrated in the accompanying drawings, wherein Figure 1 represents a well tube in vertical section showing all the parts of this invention assembled therein. Fig. 2 is a view similar to Fig. 1 but taken at a point of view at right angles with the view point in Fig. 1. Fig. 3 is a top plan view of the supporting or surface plate with the parts carried thereby, the air and water pipes being shown in cross-section. Fig. 4 is a vertical sectional view, enlarged, of the water inlet attachment hereinafter described, and showing the lower end of the air pipe in connection therewith. Fig. 5 is a cross-section of the parts illustrated in Fig. 4 upon the broken line 5—5 of Fig. 4. The indirect broken line 4—4 in Fig. 5 indicates the line upon which is taken the section of the water inlet attachment illustrated in Fig. 4. Fig. 6 is a cross-section taken upon the broken line 6—6 of Fig. 4.

Throughout the drawings and description the same letter is used to refer to the same part.

Considering the drawings, it will be noted that a surface foundation A carries the supporting plates B and *b*, which are in this case circular in form. A water pipe D and an air pipe *d* pass downwardly through the supporting plate and within the well casing C.

Above the plate B the air pipe passes through a carrier piece or block E, and through the end portions of the piece E are passed the jack screws F and *f*. The piece E is adjustably held upon the air pipe *d* by means of the set screws G and *g*. The jack screws bear upon the top or supporting plate B, as shown in Fig. 2.

At the lower end of the water pipe, and as best illustrated in Fig. 4, is an attachment or device H, for purposes of this explanation termed a water inlet attachment. At one side near the top the attachment H is provided with a hollow cylindrical portion that acts as a guide for the movement of the air pipe *d*. The lower portion of the water inlet attachment is the mixing tube J, joined to the upper portion by the fins *j* and between which water may enter at the top of the mixing tube into the attachment H. Fitting movably upon the mixing tube is the upper portion of the air chamber casing K, which has a bell mouth *k* at its lower end for the entrance of water into the water inlet tube L, which is ordinarily formed integrally with the casing K. At one side, the casing K has a projecting hollow pipe connection M, and the air pipe *d* is provided with threads to engage the connection M, as is also the scale pocket *m*. The scale pocket opens into the air chamber of the casing K, and receives solid or foreign particles of any sort which might clog the air chamber.

In explaining the operation of this invention, attention is asked to Figs. 1, 2 and 4. As has been stated the air pipe *d* is attached to the air chamber casing K, and if the pipe is raised or lowered by means of the jack screws F and *f* the air chamber casing will be moved correspondingly. As shown, the upper mouth of the water inlet tube L lies adjacent to the lower mouth of the mixing tube J, and the interval between them marked N in Fig. 4 is termed in this description the air entrance to the mixing tube. It is this entrance that is adjusted by the movement of the air tube, and it may be adjusted so that the maximum air pressure is applied to the water as it enters the mixing tube J from the water inlet tube L in what is herein termed the first stage of the operation. A very high velocity of air and water mixed rushes through the mixing tube and draws in and carries along with it additional water entering the attachment H between the fins *j*. The taking of the water at the top of the mixing tube is the second stage of operation mentioned. The aerated column of water moving upwardly under the force and expansion of the air follows and is discharged by way of the water pipe D, in the usual manner.

Having now described this invention and explained the mode of its operation, what I claim is:—

1. In an air lift pump, the combination with a supporting plate, of a water pipe, an air pipe, a water inlet attachment secured to the lower end of the water pipe and having a mixing tube, an air chamber casing secured to the lower end of the said air pipe and having a portion movably fitting the said mixing tube, the said casing being provided with an inlet water tube having its inner mouth arranged adjacent to the lower mouth of the said mixing tube, and jack screws acting upon the said supporting plate for the said water and air pipes whereby one of said pipes may be raised and lowered with respect to the other and the air entrance into said mixing tube adjusted.

2. In an air lift pump, the combination with a supporting plate, of a water pipe, an air pipe, a water inlet attachment secured to the lower end of the water pipe and having a mixing tube, an air chamber casing secured to the lower end of the said air pipe and having a portion movably fitting the said mixing tube, a scale pocket opening into the said air chamber casing, the said casing being provided with an inlet water tube having its inner mouth arranged adjacent to the lower mouth of the said mixing tube, and jack screws acting upon the said supporting plate for the said water and air pipes whereby one of said pipes may be raised and lowered with respect to the other and the air entrance into the said mixing tube adjusted.

3. In an air lift pump, the combination with a supporting plate, of a water pipe, an air pipe, a water inlet attachment secured to the lower end of the water pipe and having a mixing tube, means connected with the said attachment for guiding the movement of the lower end of one of said pipes relative to the other, an air chamber casing secured to the lower end of the said air pipe and having a portion movably fitting the said mixing tube, the said casing provided with an inlet water tube having its inner mouth arranged adjacent to the lower mouth of the said mixing tube, and jack screws acting upon the said supporting plate for the said water and air pipes whereby one of said pipes may be raised and lowered with respect to the other and the air entrance into the said mixing tube adjusted.

4. In a two stage air lift pump, the combination with a supporting plate, of a water pipe, an air pipe, a water inlet attachment secured to the lower end of the said water pipe and having a mixing tube, the said attachment having a water entrance into it located at the top of the said mixing tube, an air chamber casing secured to the lower end of the said air pipe and having a portion movably fitting the said mixing tube, the said casing being provided with an inlet water tube having its inner mouth arranged adjacent to the lower mouth of the said mixing tube, and jack screws acting upon the said supporting plate for the said water and air pipes whereby one of the said pipes may be raised and lowered with respect to the other and the air entrance into the said mixing tube adjusted.

5. In an air lift pump, the combination with a water pipe and an air pipe, of means for supporting the said pipes one movable with respect to the other, means for moving one pipe vertically with respect to the other, and a connecting device joining the lower ends of the said pipes and having a water entrance into the water pipe and an air entrance into the water pipe, the said device comprising portions attached to and movable individually with the said pipes, the said air entrance being located between the said movable portions of the device.

In testimony whereof I affix my signature.

JOHN RIGLING.